US007059751B2

(12) United States Patent
Spencer et al.

(10) Patent No.: US 7,059,751 B2
(45) Date of Patent: Jun. 13, 2006

(54) LAMP ASSEMBLY WITH MULTI-POSITIONAL COVER

(75) Inventors: Chad E. Spencer, Seymour, IN (US); Doug A. Waltrip, Seymour, IN (US)

(73) Assignee: Valeo Sylvania LLC, Seymour, IN (US)

( * ) Notice: Subject to any disclaimer, the term of this patent is extended or adjusted under 35 U.S.C. 154(b) by 28 days.

(21) Appl. No.: 10/454,557

(22) Filed: Jun. 4, 2003

(65) Prior Publication Data

US 2004/0246734 A1     Dec. 9, 2004

(51) Int. Cl.
*F21V 5/00* (2006.01)
*F21V 17/02* (2006.01)
(52) U.S. Cl. ...................... 362/520; 362/512
(58) Field of Classification Search ........... 362/487, 362/466, 460, 512, 515, 519, 524, 525, 546, 362/549, 523, 528, 509, 507, 520, 277, 282, 362/280, 319, 322, 323

See application file for complete search history.

(56) References Cited

U.S. PATENT DOCUMENTS

| 3,062,489 | A | * | 11/1962 | Zook | 362/549 |
| 4,282,566 | A | * | 8/1981 | Newman | 362/369 |
| 4,491,901 | A | | 1/1985 | Sigety, Jr. | 362/275 |
| 4,907,134 | A | * | 3/1990 | Mori | 362/549 |
| 5,107,406 | A | | 4/1992 | Sekido et al. | 362/61 |
| 5,526,238 | A | | 6/1996 | Van Oel et al. | 362/66 |

* cited by examiner

*Primary Examiner*—Ali Alavi
*Assistant Examiner*—Bao Q. Truong
(74) *Attorney, Agent, or Firm*—Carlo S. Bessone

(57) ABSTRACT

A vehicle lamp assembly (10) comprises includes a mounting bracket (12) having a first end (14) formed for affixation to a vehicle and a second end (16) formed for affixation to the lamp assembly (10). A housing (18) for the lamp assembly (10) includes a central axis (20) and a light source (22) mounted with respect to the central axis (20), the housing (18) having a forward portion (24). A lens cover (26) is provided for the lamp assembly (10), and the lens cover (26) has an external, circumferential rim (28) formed to engage the forward portion (24) of the housing (18) and an adjusting tab (30) extending from the rim (28) formed to cooperate with the second end (16) of said mounting bracket (12). The lens cover (26) is freely rotatable about the central axis (20) to allow for variable positioning.

5 Claims, 1 Drawing Sheet

LAMP ASSEMBLY WITH MULTI-POSITIONAL COVER

TECHNICAL FIELD

This invention relates to lamp assemblies and more particularly to supplementary lamp assemblies, such, for example, as fog lamps, for automotive vehicles.

BACKGROUND ART

Supplementary lamp assemblies such as the afore-mentioned fog lamps are often provided for automotive vehicles. The lamp assemblies vary in size, shape and location depending upon the vehicle. For example, sedans and trucks usually have these lamp assemblies in very different locations, making mounting of these lamp assemblies a very customized effort. Prior art lamp assemblies have had an adjusting tab (or lamp mounting unit) formed on the lamp assembly housing, requiring its location to be pre-determined so as to cooperate with a mounting bracket on the vehicle. U.S. Pat. No. 4,907,134 discusses providing an adjusting or mounting tab on a lens cover; however, for a rectangular lamp assembly, thereby requiring a customized assembly for each different vehicle.

It would be an advance in the art to provide a lamp assembly that was readily adaptable to more than one vehicle.

DISCLOSURE OF INVENTION

It is, therefore, an object of the invention to obviate the disadvantages of the prior art.

It is another object of the invention to enhance vehicle lamp assemblies.

It is yet another object of the invention provide a vehicle lamp assembly that reduces cost.

These objects are accomplished, in one aspect of the invention by the provision of a vehicle lamp assembly that comprises a mounting bracket having a first end formed for affixation to a vehicle and a second end formed for affixation to the lamp. A housing for the lamp includes a central axis and a light source mounted with respect to the axis. The housing has a forward portion. A lens cover is provided for the lamp and has an external, circumferential rim formed to engage the forward portion of the housing and an adjusting tab extending from the rim formed to cooperate with the second end of the mounting bracket. The lens cover is freely rotatable about the central axis before being fixed to the forward portion of the housing.

By providing the adjusting tab on the rim of a freely rotatable lens cover, the lens cover is rotatable about the centerline to new and different locations, thus providing flexibility.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
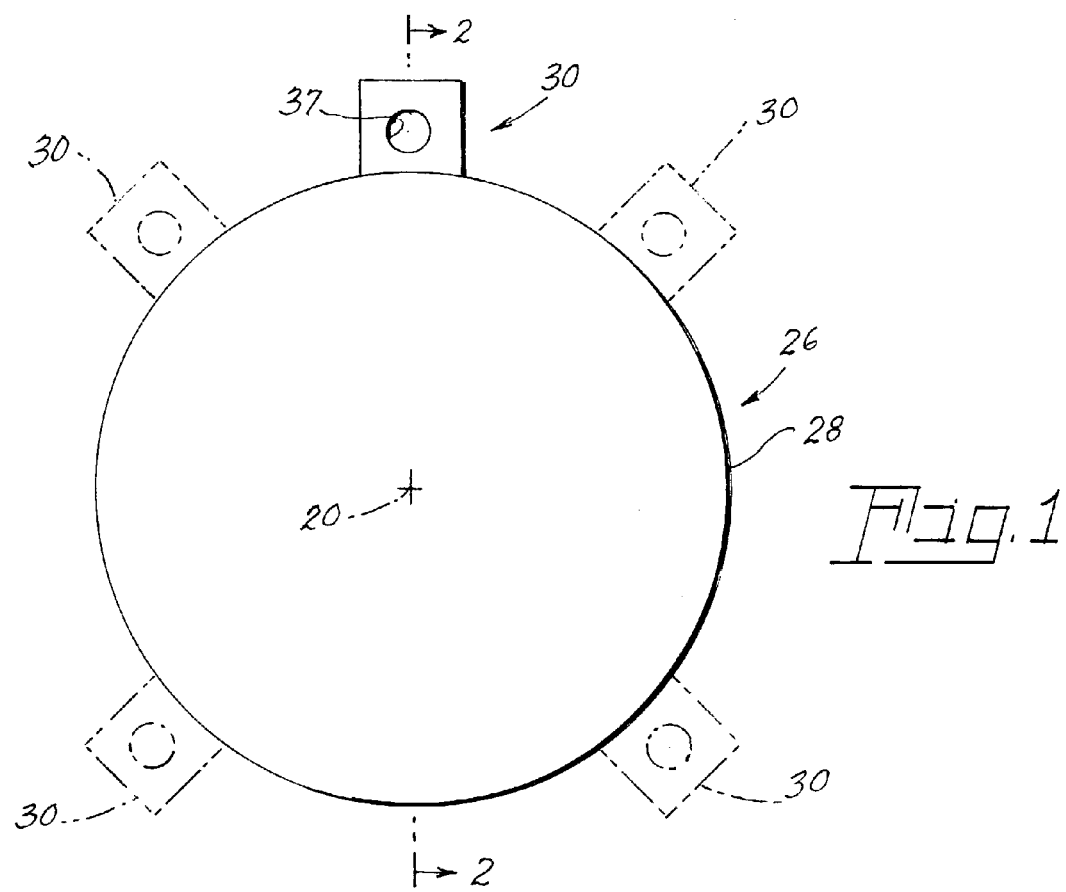
FIG. 1 is an elevational view of a lens cover in accordance with an embodiment of the invention.

Referring now to the drawings with greater particularity, there is shown in FIG. 1 a lens cover 26 for a vehicle lamp assembly 10. The lens cover 26 is circular, optic-free, and has a circumferential rim 28 with and adjusting tab 30 projecting away from the rim 28. The lens cover 26 is freely rotatable about a central axis 20.

Figure 2:
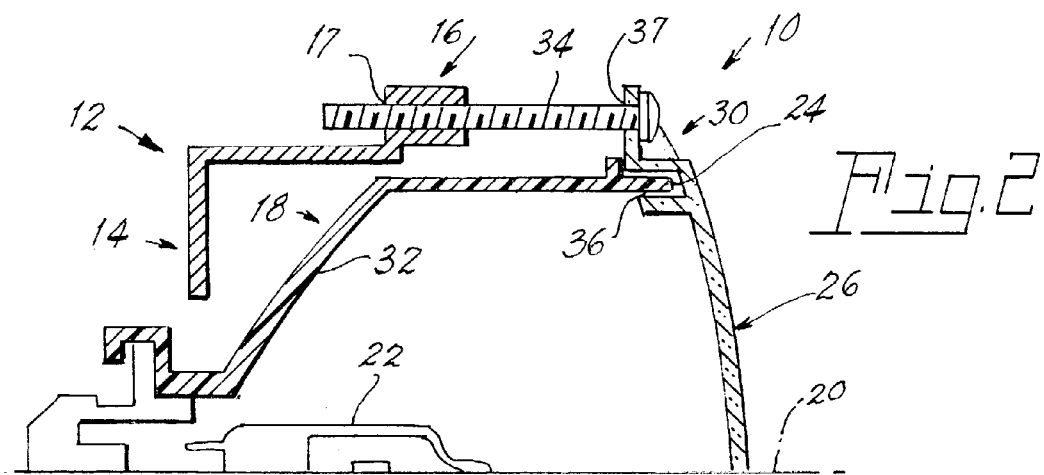
FIG. 2 is an elevational, sectional view taken along the line 2—2 of FIG. 1.

Referring now to FIG. 2, which is sectional view taken along the line 2—2 of FIG. 1, there is shown a vehicle lamp assembly 10 comprising a mounting bracket 12 with a first end 14 formed for affixation to a vehicle and a second end 16 formed for affixation to the vehicle lamp assembly. The second end 16 is preferably formed as a threaded portion 17.

A housing 18 for the lamp assembly 10 includes a central axis 20 with a light source 22, for example, a halogen bulb, mounted with respect to the axis 20, in this instance, the light source is coaxial with the central axis. An interior wall 32 of the housing 18 can be provided with a reflective region having an optical prescription thereon.

The housing 18 has a forward portion 24 for receiving the lens cover 26. In a preferred embodiment of the invention the circumferential rim 28 of the lens cover 26 is provided with a groove 36 for engaging the forward portion 24 of the housing 18 and the adjusting tab 30 is provided with an aperture 37 (see FIG. 1) for receiving an adjusting screw 34.

For mounting in a vehicle, the location of the mounting bracket 12 is determined and the alignment desired for the housing 18 is also ascertained. With these positions fixed, the lens cover 26 is aligned with the forward portion of the housing 18 so the adjusting tab 30 is aligned with the second end 16 of the mounting bracket 12. The lens cover 26 is affixed to the housing 18 appropriately, as by cementing, and the lamp assembly 10 is then affixed to the mounting bracket 12 by means of an adjusting screw 34.

Because the lens cover 26 is preferably optic-free and freely rotatable, (some lens optic treatment may be applicable) it will be apparent that it can be moved about the central axis 20 to any desired location to align with the mounting bracket. In FIG. 1 several alternate positions of the adjusting tab 30 are shown in phantom.

There is thus provided a vehicle lamp assembly that is virtually universal. The vehicle manufacturer has freedom to design the vehicle and position the mounting bracket where it is convenient and still know that the lamp assembly can be properly aligned to provide the desired lighting pattern.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A vehicle lamp assembly comprising:
   a mounting bracket having a first end formed for affixation to a vehicle and a second end formed for affixation to said lamp;
   a housing for said lamp including a central axis and a light source mounted with respect to said axis, said housing having a forward portion; and
   a lens cover for said lamp, said lens cover having an external, circumferential rim formed to engage said forward portion of said housing and an adjusting tab extending from said rim and formed to cooperate with said second end of said mounting bracket, said lens cover being freely rotatable about said central axis.

2. The vehicle lamp assembly of claim 1 wherein said lens cover is circular.

3. The vehicle lamp assembly of claim 1 wherein said lens cover is optic-free.

4. The vehicle lamp assembly of claim 1 wherein said housing has an interior wall defining a reflective region having an optical prescription.

5. The vehicle lamp assembly of claim 1 wherein said adjusting tab cooperates with said second end of said mounting bracket by means of an adjusting screw.

* * * * *